United States Patent [19]

Farchmin

[11] Patent Number: 5,142,135
[45] Date of Patent: Aug. 25, 1992

[54] OPTICAL SENSOR PROJECTING AN IMAGE OF THE SENSOR FOR ALIGNMENT PURPOSES

[75] Inventor: David W. Farchmin, Grafton, Wis.

[73] Assignee: Allen-Bradley Company, Inc., Milwaukee, Wis.

[21] Appl. No.: 600,340

[22] Filed: Oct. 19, 1990

[51] Int. Cl.⁵ .................... G01J 1/20; H01J 40/14
[52] U.S. Cl. .................... 250/206.1; 250/566
[58] Field of Search .......... 250/201.1, 206.1, 568, 250/548, 216, 566; 356/141, 152, 4; 235/462, 463, 467, 472

[56] References Cited

U.S. PATENT DOCUMENTS

| | | | |
|---|---|---|---|
| 4,694,182 | 9/1987 | Howard | 250/566 |
| 4,740,675 | 4/1988 | Brosnan et al. | 250/568 |
| 4,742,217 | 5/1988 | Wilwerding | 250/216 |
| 4,818,886 | 4/1989 | Drucker | 235/472 |
| 4,831,275 | 5/1989 | Drucker | 250/566 |
| 4,963,756 | 10/1990 | Quan et al. | 235/462 |

Primary Examiner—David C. Nelms
Assistant Examiner—Stephone B. Allen
Attorney, Agent, or Firm—Quarles & Brady

[57] ABSTRACT

An alignment system for an optical sensor projects an alignment image coincident with the field-of-view of the sensor. The alignment image is produced by illuminating a non-specular reflecting surface co-planar with the photosensitive element of the sensor and using the same lens as that which receives the image of the imaged object to project that image on the imaged object for alignment purposes. The light source may be turned off for normal use of the optical sensor.

13 Claims, 2 Drawing Sheets

OPTICAL SENSOR PROJECTING AN IMAGE OF THE SENSOR FOR ALIGNMENT PURPOSES

BACKGROUND OF THE INVENTION

1. Field of the Invention

The field of the invention is optical sensors used in industrial processes and in particular optical sensors having means for aligning their fields-of-view with an area of interest.

2. Background Art

The use of optical sensors is known for the control of industrial processes and for the inspection of manufactured goods. For example, such devices may provide continuous gauging of product, confirmation of package filling, or detection of surface defects.

An optical sensor may be no more than an individual photocell, but for more demanding applications, the optical sensor will be an array of photosensitive elements. The photosensitive elements may be arranged over a rectangular area (a rectangular array) or arranged along a line (a linear array). The rectangular array produces a rectangular matrix of image data suitable for forming a two dimensional image. The linear array may also produce a rectangular matrix of image data by the simple expedient of scanning the array over the imaged object, typically by having the imaged object move past the linear array on a conveyor belt or the like.

Precise alignment of the optical sensor is generally desired to ensure that the full spatial resolution of the photosensitive elements is effectively employed. Ideally, the image projected on the photosensitive elements will span the entire imaging surface of the optical sensor so that no sensor element is unused and no portion of image is missed. A coarse alignment of the optical sensor may be made by sighting along the housing of the sensor or by simple geometric calculations. When precise alignment is required, however, these techniques are not acceptable.

The image produced by the optical sensor might be used to make a precise alignment of the field-of-view of the optical sensor, but an image is not always available. Both the linear and rectangular array may provide sufficient data to produce an image, however, often this data is used without conversion to human viewable form. The data may be processed directly by the process control system or interpreted and compiled for statistical purposes without intervening display. When it is desired that an image be produced, the image displaying terminal is often remote from the optical sensor, either to protect the former from the adverse environment to which the optical sensor is exposed, or for reasons of space or convenience. A remotely produced image is of limited value for alignment. In addition, when a linear array is used, a human viewable image may require that the imaged object be moving, a condition that may not be obtainable during the initial installation and alignment of the optical sensor.

In each of these cases, no human viewable image is available to assist in the alignment of the field-of-view of the optical sensor with the area of interest of the imaged object.

One method of providing for precise alignment of an optical sensor without displaying an image is by projecting a light beam along the field-of-view of the optical sensor so as to create an alignment image that coincides with the field-of-view of the optical sensor. In one implementation, a beam splitter/combiner may be positioned between the photosensitive elements and the imaged object. The alignment image is directed into the beam splitter/combiner to be projected along the axis of the field-of-view of the optical sensor. The alignment of the optical sensor may then be performed by moving the optical sensor so that this projected alignment image is superimposed on the area of interest on the imaged object. If no imaged object is available, a reflecting card may be positioned in the area of interest and the projected image superimposed on that card.

The alignment image may be generated by a specially shaped filament of a bulb which is sized to accurately represent the dimensions of the imaging surface of the photosensitive elements.

One strength of such a system is that the projected alignment image may have the same divergence as the field-of-view of the optical sensor to permit accurate gauging of both the field-of-view's angular position and its size at various distances.

There are, however, two disadvantages to such a system. The first is that the accuracy of the alignment depends on precise positioning of the beam splitter and the projecting source. Any error in the angular position of the beam splitter/combiner will be "amplified" by the length of the optical path as measured between the photosensitive elements and the imaged object. This is true also with errors in the relative angular position of the projection source. Replacement of the projecting source, for example, if it is a bulb, or physical shock, may cause such errors. In either case, if the projected alignment image does not coincide with the field-of-view of the optical sensor, the effectiveness of the alignment image will be reduced.

The second disadvantage to the above described system is that the addition of a beam splitter/combiner and a projection source substantially increases the complexity of the optical path within the optical sensor.

SUMMARY OF THE INVENTION

The present invention provides a means of producing an alignment image, for use with an optical sensor, which overcomes the disadvantages referred to above. Specifically, the optical sensor includes a photosensitive element positioned to receive an image of an imaged object projected on the surface of the photosensitive element by a focusing element. A surface in substantially the same plane as the photosensitive element is illuminated by a light source. An alignment image of that surface is projected by the focusing element on the imaged object and serves to aid in the alignment of the optical sensor.

It is one object of the invention to provide a means for creating an alignment image which better resists the deleterious effects of manufacturing imprecision and physical shock. The same focusing element used to project the image of the imaged object on the photosensitive element is used to project the alignment image on the imaged object. This eliminates possible misalignment stemming from two separate focusing elements. The alignment image is an image of the illuminated surface which may be integral, or rigidly affixed to the photosensitive element. This ensures the coincidence of the alignment image and the field-of-view of the optical sensor.

It is another object of the present invention to produce a projected alignment image using a simplified optical system. The illuminated surface, co-planar with the photosensitive element, eliminates the need for a beam splitter/combiner as has been used previously. The light source, which serves only to illuminate the illuminated surface need not be sized or positioned with accuracy.

The illuminated surface may be a non-specular reflecting surface and the light source may be positioned to cast its light along an illumination axis to strike the non-specular reflecting surface near its edge and at an angle of incidence. The position of the light source is adjusted so that reflected light along the angle of reflectance equal to the angle of incidence is fully received by the focusing element.

A further object of the invention, then, is to maximize the visibility of the projected alignment image by focusing the illumination on the clearly defined edges of the reflecting surface and to maximize the light accepted by the focusing element.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
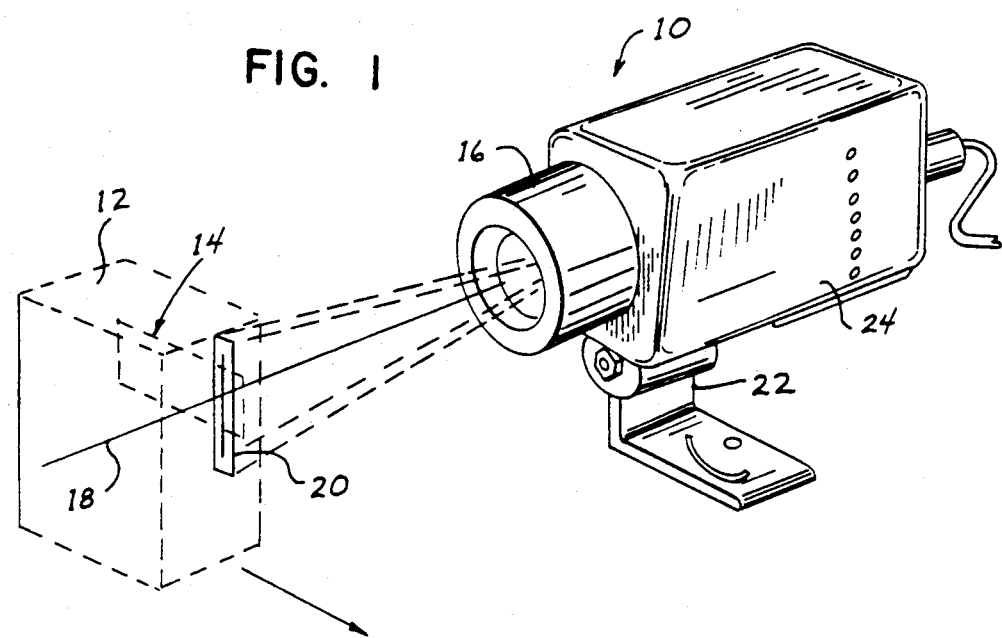
FIG. 1 is a perspective view of an optical sensor showing the projected alignment image with respect to an imaged object having a target area.

Referring to FIG. 1, an optical sensor 10, according to the present invention, is positioned with respect to an imaged object 12 so as to receive light reflected from a target area 14 on the imaged object 12 through lens assembly 16 along an optical axis 18. Typically, the imaged object 12 moves past the optical sensor 10 so that a sequence of such objects 12 may be viewed by the optical sensor 10, although alternatively the optical sensor 10 may itself move.

The target area 14 of the imaged object 12 may be a surface to be inspected for certain product characteristics or may be a coded marking such as a bar code or the like. The source of the light reflected from the target area 14 may be the ambient light of the immediate environment or may be a illuminator (not shown) associated with the optical sensor 10 and directed to the target area 14. As is understood in the art, stroboscopic lights (not shown) may be used in conjunction with the optical sensor 10 to both illuminate the target area 14 and to control the viewing time of the target area 14.

According to the present invention, an alignment image 20 is projected by the lens assembly 16 of the optical sensor 10 along the optical axis 18 so that the optical sensor 10 may be aligned to best receive light from the target area 14 In an alignment mode, the alignment image 20 is projected on the imaged object 12 and as projected will be indicated the area over which light will be detected from the imaged object 12 by the optical sensor 10. The general area of the alignment image 20 indicates the angle of the optical axis 18 permitting approximate alignment of the optical sensor 10 with the imaged object 12. The alignment image 20 is focused by rotating the lens assembly 16 and when focused, the area of the alignment image 20 will accurately indicate the area on the imaged object 12 from which light will be received and detected by the optical sensor 10. The focusing of the alignment image 20 also provides an approximate guide to the proper focusing of the optical sensor 10 for light so received as will be understood from the description to follow.

The optical sensor 10 is supported on a swivel mounting attached to the case 24 of the optical sensor 10 permitting the optical sensor 10 to be repositioned as described above.

Figure 2:
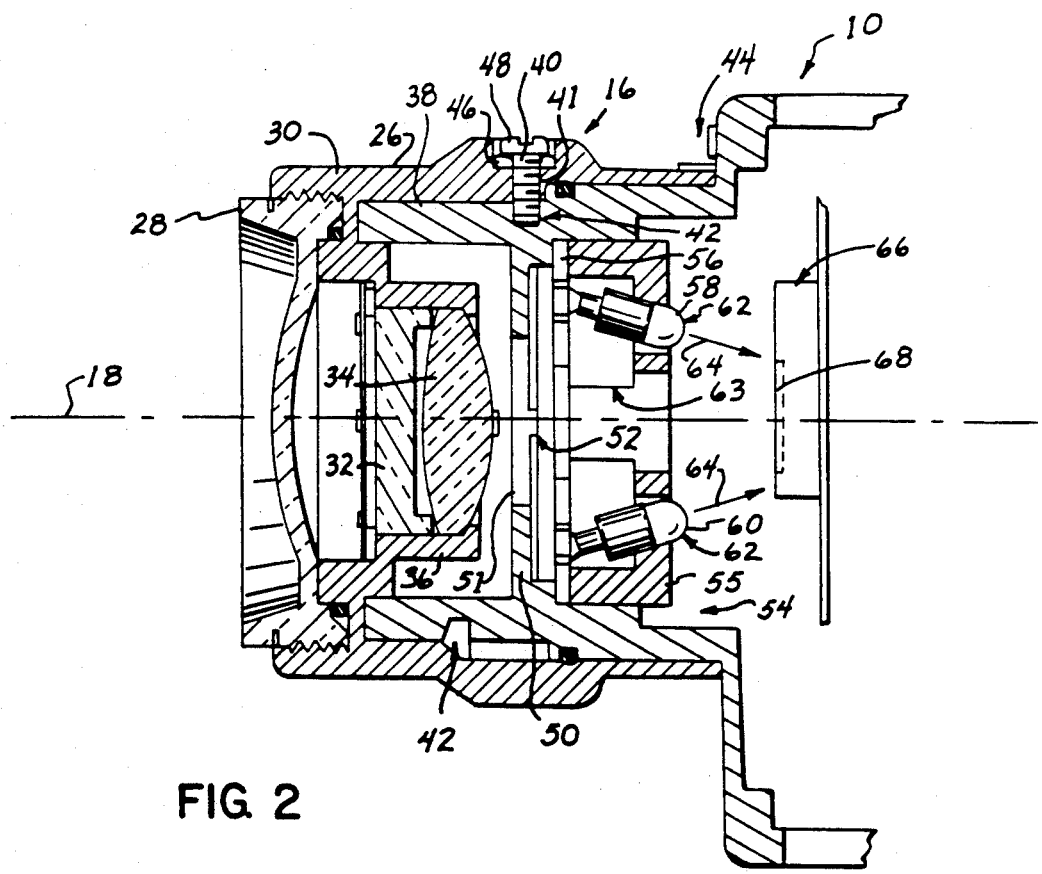
FIG. 2 is a cross-section of the lens assembly of the optical sensor of FIG. 1 showing the relative locations of an imaging surface, focusing lenses, and light sources for the imaging surface.

Referring to FIG. 2, the lens assembly 16 includes a cylindrical tube 26 oriented with its cylindrical axis parallel to the optical axis 18. The tube 26 is capped at its front end by a circular plastic window 28 which provides protection for the internal optical assembly and may be replaced if damaged. The plastic window 28 is held in the tube 26 by threads on its outer surface received by corresponding threads on the inner surface of tube 26. The plastic window 28 is sealed against the tube 26 by 0-ring 30.

Behind the plastic window 28, within the tube 26 and generally aligned with the optical axis 18 are front and rear lenses 32 and 34. Lenses 32 and 34 are held by flange 36 which protrude inwardly from the inner surface of the tube 6.

The tube 26 fits over a lesser diametered sleeve 38 so as to slide axially therealong. A threaded pin 40 extends radially through a hole 41 in the tube 26 into a helical slot 42 cut along the outer wall of the sleeve 38. The pin 40 follows the helical slot 42 to provide precise control of the axial movement of the tube 26 with respect to the sleeve 38 for a given rotation of the tube 26 with respect to the sleeve 38. This permits accurate focusing of the optical sensor 10 on the imaged object 12 as will be described further below. The hole 41 in the tube 26 is threaded so that the threaded pin 40 may be tightened against the bottom of the helical slot 42 to prevent further movement of the tube 26 relative to the sleeve 38 until the threaded pin is loosened. Thus, the focus of the optical sensor 10 may be locked against inadvertent movement. An 0-ring 46 fits beneath a head 48 of the threaded pin 40 to prevent contaminants from being introduced through the hole 41. The sleeve 38 and tube 26 have index marks 44 on their outer surfaces to permit the relative rotation of the two to be precisely determined. These index markings 44 are keyed to distance measurements between the optical sensor 10 and the imaged object 12 to provide a method of focusing the optical sensor 10 by determining the distance between it and the imaged object 12.

A baffle wall 50 extends radially inward from the inner wall of sleeve 38 behind the front and rear lenses 34 and 36 to form a centrally located opening 51 about the optical axis 18. An aperture 52, attached to the baffle wall 50, blocks the light passing through the opening 51 but outside of the aperture 52. The dimensions and orientation of the aperture 52 will be described further below.

A disk shaped lamp assembly 54 is held coaxially within the sleeve 38 behind the aperture 52, with respect to the front window 28, by the inner wall of the sleeve 38. The lamp assembly 54 includes a cup shaped lamp housing 55 opening toward the front of the tube 26 and capped by a disk shaped printed circuit board 56. Attached to the printed circuit board 56 and held within the space between the printed circuit board 56 and the lamp housing 55 are first and second halogen lamps 58 and 60. The lamps 58 and 60 extend through holes in the housing 55 positioned above and below the optical axis 18 and so that the lamps 58 and 60 project light generally away from the front of the tube 26 holding the plastic window 28. A power lead (not shown) attaches to the printed circuit board 56 to provide power to the lamps 58 and 60. The power to the lamps 58 and 60 may be switched on and off as will be described.

The lamp assembly 54 has a generally rectangular opening 63 located along the optical axis 18 and larger than the aperture 52 to permit any light passed by the aperture 52 to also pass through the opening 63 in the lamp assembly 54.

The lamps 58 and 60 include integral focusing lenses 62 so as to concentrate their light along illumination axes 64. The illuminations axes 64 of the lamps 58 and 60 are tipped slightly toward the optical axis 18, as will be described in more detail below, to converge on a photosensitive element 66 element centered on the optical axis 18 behind the lamp assembly 54 and facing so as to receive light from the lamp assembly 54 and/or the imaged projected from the imaged object 12.

The photosensitive element 66 is a charge coupled device ("CCD") linear image sensor such as is commercially available having 1024 photodiodes, each 14 μm square and arranged along a line at 14 μm centers to form an imaging surface 68. As is generally known in the art, the intensity of the light striking each photodiode may be separately determined by "shifting" the electrical charge associated with each photodiode out of the device, in series, in response to a clock signal.

Figure 4:
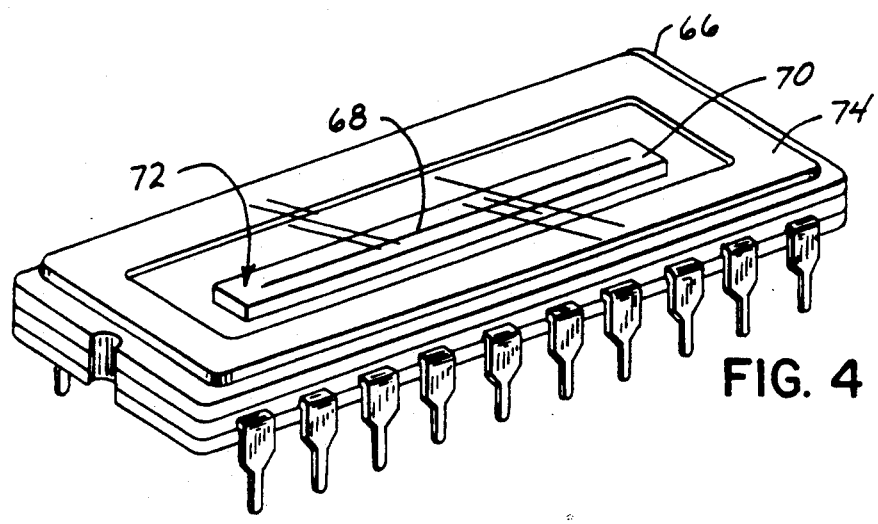
FIG. 4 is a perspective view of the imaging surface as contained in a protective carrier.

Referring to FIG. 4, the dimensions of the imaging surface 68 is 14 μm by 14.34 mm. The imaging surface 68 is constructed on a silicon chip 70 which is larger than the imaging surface 68 having dimensions of approximately 16 mm by 1.3 mm. The surface of the chip 70 outside of the imaging surface 68 is coated with a thin metallization layer 72 to prevent light received over this peripheral area from affecting the sensing at the imaging surface 68. This metallization layer 72 is generally a specular or mirror-like surface, however, a non-specular surface may also be used. The chip 70 is covered by a protecting glass slip 74. The light from lamps 58 and 60 reflected by the metallization layer 72 is received by the rear and front lenses 36 and 34 and projected on the imaged object at the alignment image 20.

Figure 3:
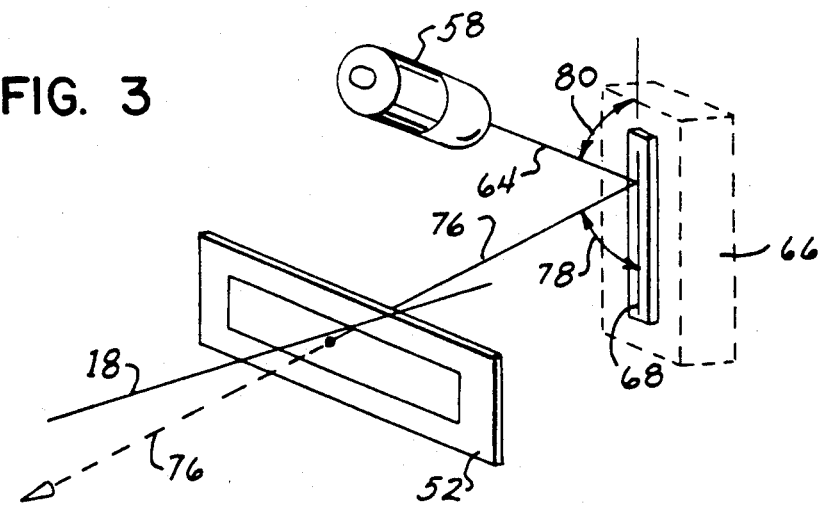
FIG. 3 is a perspective, diagrammatic view of the geometry of the imaging surface, focusing lenses, and one light source.

Referring to FIG. 3, the aperture 52 and the imaging surface 68 are disposed within planes along and perpendicular to the optical axis 18. The aperture 52 is an elongate slit and extends perpendicular to the extension of the imaging surface 68. As is understood in the art, the aperture 52 improves the depth of field of the lens assembly 16 by restricting off-axis rays of light which blur the image formed on the imaging surface 68. However, because the imaging surface 68 is one dimensional, such blurring is only a concern if directed along the extent of the imaging surface 68. Therefore, only those rays of light which are off-axis along the extent of the imaging surface 68 need be restricted. In the direction perpendicular to the extent of the imaging surface 68, the aperture 52 is wide to admit as much light as possible, improving the sensitivity of the optical sensor 10 without loss of resolution. In general, the aperture 52 defines the acceptance angle of the lens assembly 16, that angle being the maximum angle of deviation that a light ray may have from the optical axis 18 and still be transmitted by the lens assembly 16.

As mentioned, the halogen lamps 58 and 60 incorporate lenses 62 to focus the light from the lamps generally along a illumination axis 64 which strikes the metallization layer 72. Although this metallization layer 72 is generally specular, even if the surface is non-specular the angle 78 of the principal axis of light reflection 76 will be equal to the angle of incidence 80 of the corresponding illumination axes 64. A non-specular surface will also reflect light at other angles but with generally decreasing intensity as those angles diverge from the reflection angle 78.

The relative location of the lamps 58 and 60, imaging surface 68, and aperture 52 are adjusted so that the illumination axis 64 intersects the metallization layer 72 near one end of the imaging surface 68, and the reflection axis 76 passes through the center of the aperture 52 ensuring the maximum transmission of light energy. One bulb 58 or 60 illuminates each end of the imaging surface 68, as the ends convey the most information about the position of the imaging surface 68. During the alignment mode of the optical sensor 10, the lamps 58 and 60 are turned on to project an alignment image 20. Once the optical sensor 10 is aligned, the lamps 58 and 60 are turned off so as not to interfere with the detection of light from the imaged object 12.

Figure 5:
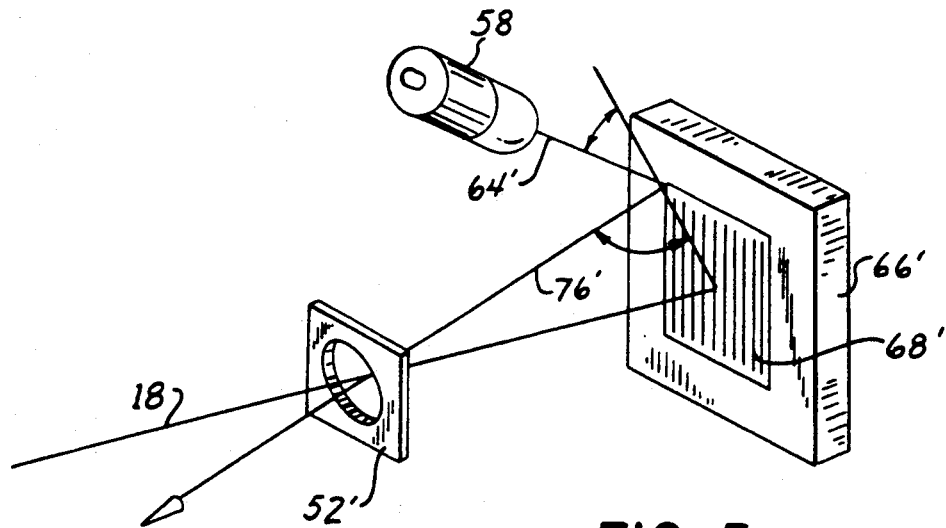
FIG. 5 is a perspective view of the second embodiment of the optical sensor using a dimensional imaging surface.

Referring to FIG. 5, in a second embodiment, a photosensitive detector 66' incorporating a two dimensional imaging surface 68' may be substituted for the linear imaging surface 68 of photosensitive detector 66 as shown in FIG. 3. In such an embodiment, four beams (only one shown) are directed to illuminate the four corners of the two dimensional imaging surface 68'. The illumination axis 64' of each of the four beams is adjusted so that the reflectance axis 76' passes through the center of the aperture 52'. The aperture 52' nows defines a circular opening necessary as a result of the second dimension of imaging and the need to eliminate off-axis rays as described above.

Many modifications and variations of the preferred embodiment which will still be within the spirit and scope of the invention will be apparent to those with ordinary skill in the art. For example, the non-specular surface need not be a metallization layer but may be a co-planar non-specular material rigidly affixed to the imaging surface. In order to apprise the public of the various embodiments that may fall within the scope of the invention, the following claims are made.

I claim:

1. An optical sensor for detecting light modulated by a passing object and for producing an intensity signal dependant on that modulation, the optical sensor comprising:

a photosensitive element for producing an intensity signal in response to light striking the imaging surface;

a focusing means positioned with respect to the photosensitive element to define an optical axis and for focusing an image of the object, in an imaging mode, on the photosensitive element when the object passes the optical axis at a focus distance; and a light source for directing light, in an alignment mode, toward the photosensitive element to project an image of the photosensitive element at the focus distance.

2. An optical sensor according to claim 1 wherein the photosensitive element is a linear array and the light source produces two beams, one to illuminate each end of the linear array.

3. An optical sensor according to claim 2 wherein the two beams are produced by two lamps.

4. An optical sensor according to claim 1 wherein the photosensitive element is a rectangular array and the light source produces four beams one to illuminate each corner of the rectangular array.

5. An optical sensor according to claim 4 wherein the four beams are produced by four lamps.

6. An optical sensor for detecting light modulated by a passing object and for producing an intensity signal dependant on that modulation, the optical sensor comprising:

a photosensitive element having an imaging surface substantially within a plane for producing an intensity signal in response to light striking the imaging surface;

a focusing means positioned with respect to the photosensitive element to define an optical axis and for focusing an image of the object on the imaging surface when the object passes the optical axis at a focus distance;

a light source for directing light toward the photosensitive element; and an illuminated surface in substantially the same plane as the imaging surface for receiving light from the light source and for transmitting the light along the optical axis to the focusing means to project an image of the illuminated surface at the focus distance.

7. An optical sensor according to claim 6 wherein the illuminated surface is a specular reflecting surface for reflecting the light from the illuminated surface along the optical axis to the focusing means to project an image of the illuminated surface at the focus distance.

8. An optical sensor according to claim 6 wherein the photosensitive element is a semiconductor device and the illuminated surface is a metallization mask on the semiconductor device.

9. An optical sensor according to claim 6 wherein:

the focusing means has an acceptance angle;

the light source projects light along an illumination axis to strike the illuminated surface at a first point at a first angle measured with respect to the plane of the illuminated surface; and the first angle is equal to a second angle of a ray between the first point and the focusing means within the acceptance angle measured with respect to the plane of the illuminated surface.

10. An optical sensor according to claim 6 wherein the photosensitive element is a linear array and the light source produces two beams, one to illuminate each end of the linear array.

11. An optical sensor according to claim 10 wherein the two beams are produced by two lamps.

12. An optical sensor according to claim 6 wherein the photosensitive element is a rectangular array and the light source produces four beams one to illuminate each corner of the rectangular array.

13. An optical sensor according to claim 12 wherein the four beams are produced by four lamps.

* * * * *